United States Patent
Wang et al.

(10) Patent No.: US 8,757,257 B2
(45) Date of Patent: Jun. 24, 2014

(54) CROWN-SHAPED SEPARATION DEVICE FOR SEPARATING OIL AND WATER IN WELL

(71) Applicants: PetroChina Company Limited, Beijing (CN); Daqing Oilfield Co., Ltd, Daqing (CN)

(72) Inventors: Yan Wang, Daqing (CN); Demin Wang, Daqing (CN); Rongjie Zhu, Daqing (CN); Long Ren, Daqing (CN); Rong Zhong, Daqing (CN); Hongyan Wang, Daqing (CN)

(73) Assignees: PetroChina Company Limited, Beijing (CN); Daqing Oilfield Co., Ltd., Heilongjiang Province (CN)

( * ) Notice: Subject to any disclaimer, the term of this patent is extended or adjusted under 35 U.S.C. 154(b) by 0 days.

(21) Appl. No.: 14/020,942

(22) Filed: Sep. 9, 2013

(65) Prior Publication Data
US 2014/0000872 A1    Jan. 2, 2014

Related U.S. Application Data

(63) Continuation of application No. PCT/CN2011/001640, filed on Sep. 28, 2011.

(30) Foreign Application Priority Data

Mar. 9, 2011   (CN) .................. 2011 2 0060174 U
Mar. 9, 2011   (CN) .................. 2011 2 0060175 U

(51) Int. Cl.
*E21B 43/38*   (2006.01)

(52) U.S. Cl.
USPC ........................ 166/265; 166/105.1

(58) Field of Classification Search
USPC .............. 166/265, 105.1, 105.2, 105.3, 105.4
See application file for complete search history.

(56) References Cited

U.S. PATENT DOCUMENTS

| | | | |
|---|---|---|---|
| 3,931,011 A * | 1/1976 | Richards et al. .............. | 210/136 |
| 4,241,788 A | 12/1980 | Brennan | |
| 8,453,726 B2 | 6/2013 | Wang et al. | |

FOREIGN PATENT DOCUMENTS

| CN | 1626770 A | 6/2005 |
|---|---|---|
| CN | 101025080 A | 8/2007 |

(Continued)

OTHER PUBLICATIONS

English Translation of the Abstract, CN 101025080A.
English Translation of the Abstract, CN 101773742 A.
English Translation of the Abstract, CN 1626770A.

(Continued)

*Primary Examiner* — William P Neuder
(74) *Attorney, Agent, or Firm* — Woodard, Emhardt, Moriarty, McNett & Henry LLP

(57) ABSTRACT

The present invention relates to a crown-shaped separation device for separating oil and water in a well. Separator joints are sleeved on a central tube, and a separator is arranged between adjacent separator joints. Settlement cups are sleeved on the central tube, and two adjacent settlement cups are inserted together. A multi-rib separating bowl is embedded in the settlement cup. The settlement cup is crown shape. The bottom of the settlement cup is formed with multiple ribs. An angle is formed between the convex rib of the bottom of the settlement cup and the horizontal line. The top edge of the settlement cup is sawtooth shape corresponding to the shape of the cup bottom. An annular space is formed between the cup base of the settlement cup and the central tube. The central tube corresponding to the annular space is provided with a fluid inlet. The shape of the multi-rib separating bowl is identical to that of the bottom of settlement cup, and the multi-rib separating bowl is provided with a fluid passage. The downhole device solves the effective separation of oil and water.

9 Claims, 4 Drawing Sheets

(56) References Cited

FOREIGN PATENT DOCUMENTS

| | | |
|---|---|---|
| CN | 101377126 A | 3/2009 |
| CN | 101773742 A | 7/2010 |
| CN | 201599019 U | 10/2010 |
| CN | 201943683 U | 8/2011 |
| CN | 201943684 U | 8/2011 |
| RU | 2 269 649 C2 | 2/2006 |

OTHER PUBLICATIONS

English Translation of the Abstract, CN 201943683U.
English Translation of the Abstract, CN 201943684U.
English Translation of Written Opinion and International Search Report, PCT/CN2011/001640, Issued Aug. 12, 2011.
English Translation, CN 201599019U.
Written Opinion and International Search Report, PCT/CN2011/001640, Issued Aug. 12, 2011.

* cited by examiner

CROWN-SHAPED SEPARATION DEVICE FOR SEPARATING OIL AND WATER IN WELL

CROSS-REFERENCE TO RELATED APPLICATIONS

This application is a continuation of PCT/CN2011/001640, filed Sep. 28, 2011, which claims the benefit of Chinese application No. 201120060174.9, filed Mar. 9, 2011 and Chinese application No. 201120060175.3, filed Mar. 9, 2011. All of the above-referenced applications are incorporated herein by reference in their entirety.

FIELD OF THE INVENTION

The invention relates to a downhole separating device for separating oil and water, particularly a downhole Crown-shaped separating device for separating oil and water.

BACKGROUND OF THE INVENTION

The conventional oil well lifting equipment of the oil field draws three-phase mixture of gas, oil and water during the downhole operation, and a small amount of which carry part of oil layer sand along with swabbing fluid. With lengthening of the development time of multiply formation field, water and sand contained in the swabbing fluid increase. If water content is too high during the production of oil well, the production cost will increase; if oil layer sand enters into the oil pump along with the fluid, the probability of stuck pump is greatly increased, which may result in unnecessary downhole servicing operation. Therefore, the prior separator used in the oil field can not effectively separate oil and water underground.

SUMMARY OF THE INVENTION

The object of invention is to solve the problem that the prior separator used in the oil field can not effectively separate oil and water when the downhole fluid is drawn by the pumping unit, and to provide a downhole crown-shaped separating device for separating oil and water.

The technical solution of the present invention is as follows: there is provided a downhole crown-shaped separating device for separating oil and water in accordance with the present invention, the separating device comprising a oil pump joint, a coupling collar, a tube joint, a central tube and a well-washing valve which are fixedly connected with one another from top to bottom in sequence. The crown-shaped separating device further comprises N sections of separators sleeved on the central tube, and N+1 separator joints sleeved on the central tube sequentially from top to bottom, N being a natural number, one section of the separator being provided between two adjacent separator joints. Each section of separator includes an upper locating sleeve, a lower locating sleeve, a plurality of sedimentation cups sleeved on the central tube sequentially from top to bottom, in which the two neighboring sedimentation cups are nested into each other and form a gap between them, the uppermost sedimentation cup on each section of separator being fixedly connected to the central tube by the upper locating sleeve, and the lowermost sedimentation cup on each section of separator being fixedly connected to the central tube by the lower locating sleeve, and a plurality of ribbed separating bowls, each sedimentation cup being provided with the ribbed separating bowl embedded therein. The sedimentation cup is crown-shaped and has a multi-ribbed polygon bottom, the rib of which forms an pitch angle of 30 to 60 degrees with the horizontal line, and the middle part of the sedimentation cup is a hollow cylinder, the upper edge of the sedimentation cup being zigzag-shaped which corresponds to the shape of the bottom, the sedimentation cup having a cup holder for holding said sedimentation cup which forms an annular space with the central tube. A group of intake holes are provided on the central tube corresponding to the annular space, a bar-shaped gap is opened on the cup holder of the sedimentation cup, the ribbed separating bowl has same shape as that of the bottom of the sedimentation cup, the ribbed separating bowl is provided with several liquid passages, and the outer diameter of the sedimentation cup is smaller than that of the separator joint. N stands for the natural number.

This invention has following advantages compared with the prior art: the separator 6 divides the extracted fluid into several parts, and aggregate and lift the oil rapidly by means of the pitch angle formed between the rib of the bottom 10-1 of the sedimentation cup 10 and the horizontal line; the shape of the ribbed separating bowl 11 in the separator 6 is consistent with the shape of the bottom 10-1 of the sedimentation cup, and the ribbed separating bowl 11 is provided with several liquid passages 11-1, so that the fluid entered into the separator 6 aggregated and lifted again, which ensures the effective separation of oil and water in the separator. The device according to the present invention realizes the separation of oil and water in fluid when the viscosity of the underground fluid is greater than 2 mPa·s, reduces the water cut of the fluid swabbed by the oil pump, and increases oil-production efficiency.

DETAILED DESCRIPTION OF THE PREFERRED EMBODIMENTS

EXAMPLE 1

Figure 1:
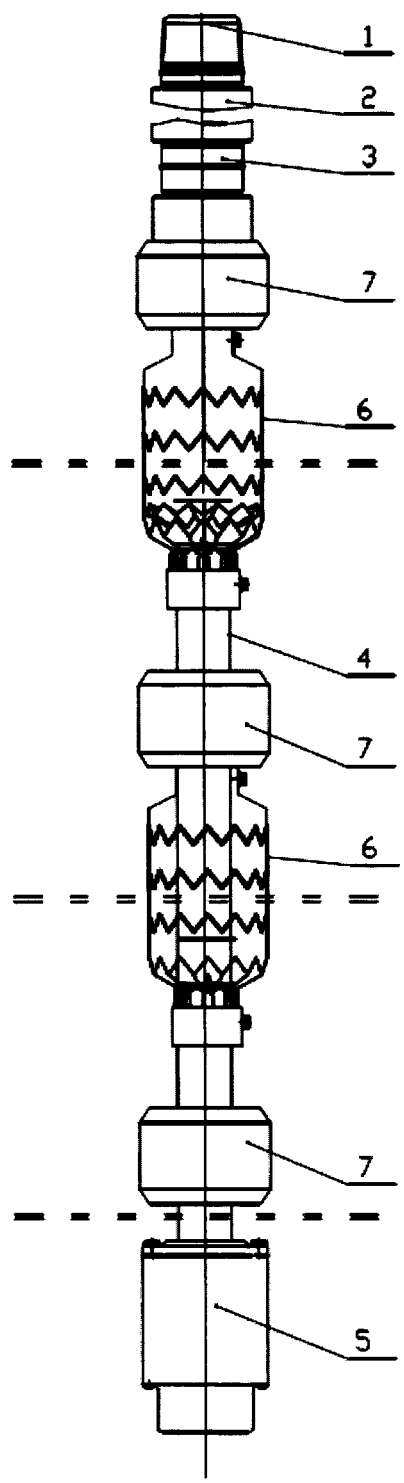
FIG. 1 is the front view of the overall structure of the separating device in accordance with the present invention.

The present embodiment is now described with reference to FIGS. 1-8. The downhole crown-shaped separating device for separating oil and water in accordance with the present embodiment comprises an oil pump joint 1, a coupling collar 2, a tube joint 3, a central tube 4 and a well-flushing valve 5 which are fixedly connected with one another from top to bottom in sequence. The crown-shaped separating device further comprises N sections of separators 6 sleeved on the central tube, and N+1 separator joints 7 sleeved on the central tube sequentially from top to bottom, N being the natural number. One section of the separator 6 is provided between two adjacent separator joints 7. Each section of separator 6 includes an upper locating sleeve 8, a lower locating sleeve 9, a plurality of sedimentation cups 10 and a plurality of ribbed separating bowls 11. The plurality of sedimentation cups 10 are sleeved on the central tube 4 sequentially from top to bottom, in which the two neighboring sedimentation cups are nested into each other and form a gap between them. The uppermost sedimentation cup 10 on each section of separator is fixedly connected to the central tube 4 by the upper locating sleeve 8, and the lowermost sedimentation cup 10 on each section of separator 6 is fixedly connected to the central tube 4 by the lower locating sleeve 9, each sedimentation cup being provided with the ribbed separating bowl 11 embedded therein. The sedimentation cup is crown-shaped and has a multi-ribbed polygon bottom 10-1. The rib 10-1-1 of the bottom 10-1 forms a pitch angle $\alpha$ of 30 to 60 degrees with the horizontal line, and the middle part of the sedimentation cup 10 is a hollow cylinder, the upper edge of the sedimentation cup 10 being zigzag-shaped which corresponds to the shape of the bottom 10-1. The sedimentation cup 10 has a cup holder 10-2 for holding said sedimentation cup which forms an annular space with the central tube 4. A group of intake holes 12 are provided on the central tube 4 corresponding to the annular space. A bar-shaped gap 10-2-1 is opened on the cup holder 10-2 of the sedimentation cup 10. The ribbed separating bowl 11 has the same shape as that of the bottom 10-1 of the sedimentation cup 10, and the ribbed separating bowl 11 is provided with several liquid passages 11-1. The outer diameter of the sedimentation cup 10 is smaller than that of the separator joint 7. N stands for the natural number.

EXAMPLE 2

The present embodiment is described with reference to FIG. 1. The number of the separator 6 of the embodiment is 60-80. The separating effect is good. Other constitution and connection relationship is the same as that of example 1.

EXAMPLE 3

Figure 3:
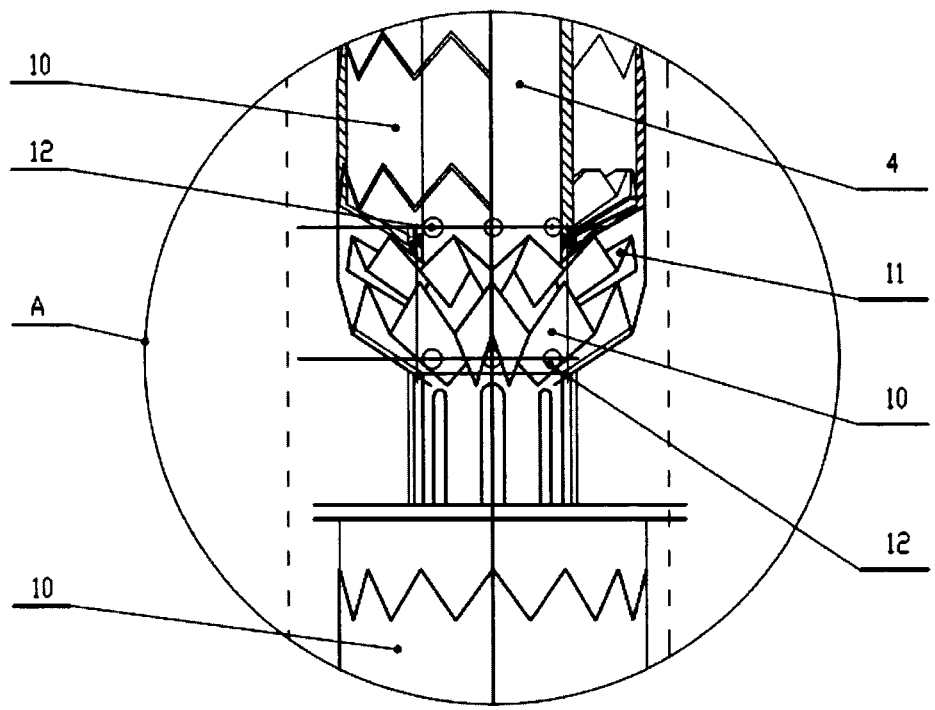
FIG. 3 is an enlarged view of A shown in the FIG. 2.
Figure 4:
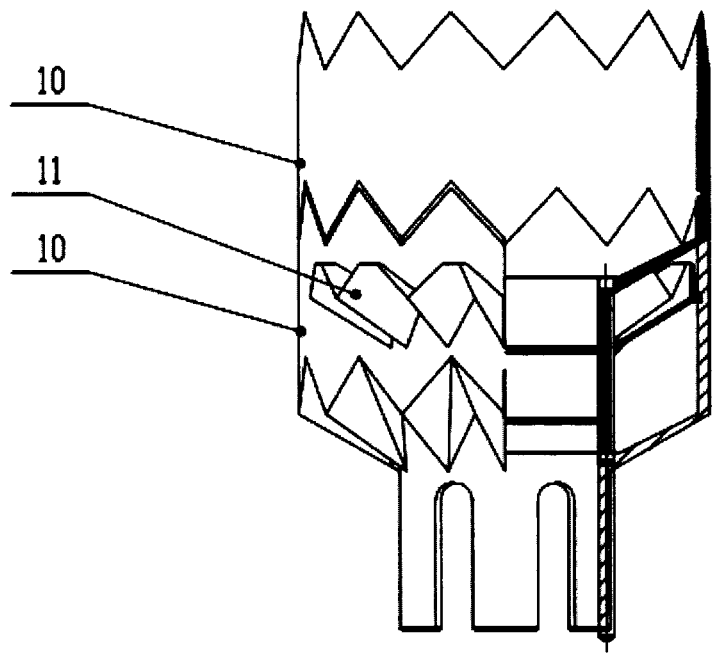
FIG. 4 is a diagram showing the positional relation of two neighboring sedimentation cups 10 and the ribbed separating bowl 11.
Figure 5:
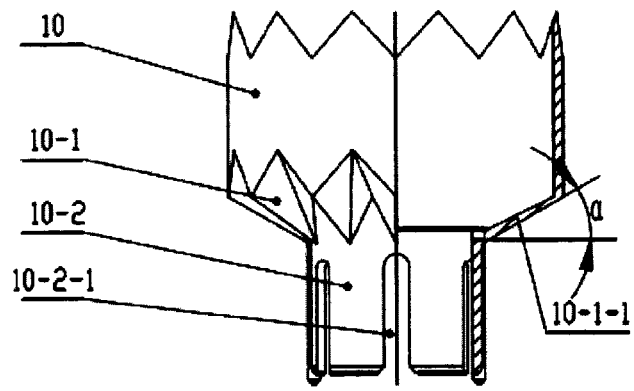
FIG. 5 is a front view of the sedimentation cup 10 in accordance with the present invention.
Figure 6:
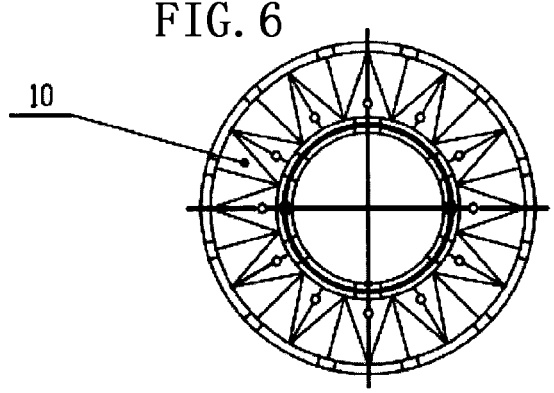
FIG. 6 is a top view of the sedimentation cup 10 in accordance with the present invention.
Figure 7:
FIG. 7 is a front view of the ribbed separating bowl 11 in accordance with the present invention.
Figure 8:
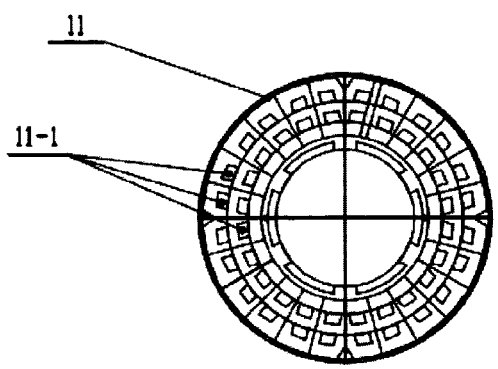
FIG. 8 is a top view of the ribbed separating bowl 11 in accordance with the present invention.

The present embodiment is described with reference to FIG. 3. The number of each group of intake holes 12 on the central tube 4 corresponding to the annular space of the embodiment is 3-12. The separating effect is good. Other constitution and connection relationship is the same as that of example 1 or example 2.

EXAMPLE 4

The present embodiment is described with reference to FIG. 3. The aperture of the intake hole 12 on the central tube 4 corresponding to the annular space of the embodiment is 0.9 mm-1.2 mm. The separating effect is good. Other constitution and connection relationship is the same as that of example 1 example 2 or example 3.

EXAMPLE 5

Figure 2:
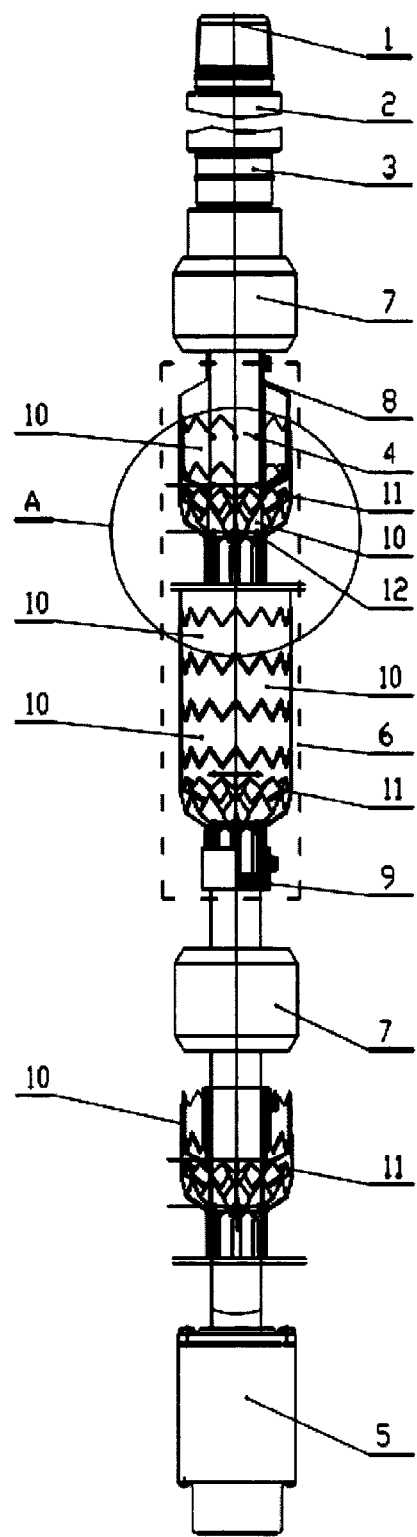
FIG. 2 is a partial cross-sectional view of the overall structure of the separating device in accordance with the present invention.

The present embodiment is described with reference to FIG. 2. The upper locating sleeve 8 and the central tube 4 are fixedly connected by bolts, and the lower locating sleeve 9 and the central tube 4 are fixedly connected by bolts. The structure is stable. Other constitution and connection relationship is the same as that of example 1, example 2, example 3 or example 4.

Industrial Applicability

The working process of the downhole crown-shaped separating device for separating underground oil and water according to the present invention: the oil pump joint 1 is connected with the oil pump; the mixture of oil and water passes through the lowest separator firstly; the separator 6 divides the extracted fluid into several parts, and aggregates and lift the oil rapidly by means of the pitch angle formed between the rib of the bottom 10-1 of the sedimentation cup 10 and the horizontal line. The shape of the ribbed separating bowl 11 in the separator 6 is consistent with the shape of the bottom 10-1 of the sedimentation cup 10, and the ribbed separating bowl 11 is provided with several liquid passages 11-1, so that the fluid entered into the separator 6 is aggregated and lifted again. The oil is further aggregated and lifted to a separator 6 by means of density difference of oil and water. Water then passes into the central tube 8 through the intake holes 12 and are extracted by the oil pump and pressurized and then injected into the objective interval.

The invention claimed is:

1. A downhole crown-shaped separating device for separating oil and water, comprising an oil pump joint (1), a coupling collar (2), a tube joint (3), a central tube (4) and a well-flushing valve (5) which are fixedly connected with one another from top to bottom in sequence;
   wherein said central tube defines a longitudinal axis and has an uppermost end and a lowermost end,
   wherein the crown-shaped separating device further comprises N sections of separators (6) sleeved on the central tube (4), and N+1 separator joints (7) sleeved on the central tube (4) sequentially from top to bottom, N being a natural number, one section of the separator (6) being provided between two adjacent separator joints (7),
   wherein each section of separator (6) includes:
   an upper locating sleeve (8),
   a lower locating sleeve (9),
   a plurality of sedimentation cups (10) sleeved on the central tube (4) sequentially from top to bottom, in which two neighboring sedimentation cups (10) are nested into each other and form a gap between them, the uppermost sedimentation cup (10) on each section of separator (6) being fixedly connected to the central tube (4) by the upper locating sleeve (8), and the lowermost sedimentation cup (10) on each section of separator (6) being fixedly connected to the central tube (4) by the lower locating sleeve (9), and
   a plurality of ribbed separating bowls (11), each sedimentation cup (10) being provided with a ribbed separating bowl (11) embedded therein,
   wherein the sedimentation cup (10) is crown-shaped and has a middle part, an upper edge, and a multi-ribbed polygon bottom (10-1), the rib (10-1-1) of which forms an pitch angle ($\alpha$) of 30 to 60 degrees with a horizontal line perpendicular to said longitudinal axis, and the middle part of the sedimentation cup (10) is a hollow cylinder, the upper edge of the sedimentation cup (10) being zigzag-shaped which corresponds to the shape of the bottom (10-1), the sedimentation cup (10) having a cup holder (10-2) for holding said sedimentation cup which forms an annular space with the central tube (4), and
   wherein a group of intake holes (12) are provided on the central tube (4) corresponding to the annular space, a bar-shaped gap (10-2-1) is opened on the cup holder (10-2) of the sedimentation cup (10), the ribbed separating bowl (11) has same shape as that of the bottom (10-1)

of the sedimentation cup (10), the ribbed separating bowl (11) is provided with several liquid passages (11-1), and the outer diameter of the sedimentation cup (10) is smaller than that of the separator joint (7).

2. The downhole crown-shaped separating device according to claim 1, wherein the number of the separator (6) is 60 to 80.

3. The downhole crown-shaped separating device according to claim 1, wherein the number of each group of intake holes (12) on the central tube (4) corresponding to the annular space is 3 to 12.

4. The downhole crown-shaped separating device according to claim 3, wherein the aperture of the intake hole (12) on the central tube (4) corresponding to the annular space is 0.9 mm to 1.2 mm.

5. The downhole crown-shaped separating device according to claim 1, wherein the upper locating sleeve (8) and the central tube (4) are fixedly connected together by bolts, and the lower locating sleeve (9) and the central tube (4) are fixedly connected by bolts.

6. The downhole crown-shaped separating device according to claim 2, wherein the number of each group of intake holes (12) on the central tube (4) corresponding to the annular space is 3 to 12.

7. The downhole crown-shaped separating device according to claim 6, wherein the aperture of the intake hole (12) on the central tube (4) corresponding to the annular space is 0.9 mm to 1.2 mm.

8. The downhole crown-shaped separating device according to claim 2, wherein the upper locating sleeve (8) and the central tube (4) are fixedly connected together by bolts, and the lower locating sleeve (9) and the central tube (4) are fixedly connected by bolts.

9. The downhole crown-shaped separating device according to claim 4, wherein the upper locating sleeve (8) and the central tube (4) are fixedly connected together by bolts, and the lower locating sleeve (9) and the central tube (4) are fixedly connected by bolts.

\* \* \* \* \*